United States Patent
Zhao et al.

(10) Patent No.: US 10,678,453 B2
(45) Date of Patent: Jun. 9, 2020

(54) METHOD AND DEVICE FOR CHECKING FALSE SHARING IN DATA BLOCK DELETION USING A MAPPING POINTER AND WEIGHT BITS

(71) Applicant: EMC IP Holding Company LLC, Hopkinton, MA (US)

(72) Inventors: Junping Frank Zhao, Beijing (CN); Fenghao Zhang, Chongqing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/270,586

(22) Filed: Sep. 20, 2016

(65) Prior Publication Data
US 2017/0090803 A1    Mar. 30, 2017

(30) Foreign Application Priority Data
Sep. 25, 2015    (CN) .......................... 2015 1 0622273

(51) Int. Cl.
*G06F 3/06*    (2006.01)

(52) U.S. Cl.
CPC ............ *G06F 3/0626* (2013.01); *G06F 3/064* (2013.01); *G06F 3/065* (2013.01); *G06F 3/0614* (2013.01); *G06F 3/0652* (2013.01); *G06F 3/0673* (2013.01)

(58) Field of Classification Search
CPC ...... G06F 3/0626; G06F 3/064; G06F 3/0673; G06F 3/065; G06F 3/0614; G06F 3/0652
See application file for complete search history.

(56) References Cited

U.S. PATENT DOCUMENTS

| | | | | |
|---|---|---|---|---|
| 8,442,952 B1 * | 5/2013 | Armangau | ........ | G06F 17/30159 706/14 |
| 8,938,425 B1 * | 1/2015 | Armangau | ........ | G06F 17/30165 707/639 |
| 9,367,395 B1 * | 6/2016 | Bono | ................... | G06F 11/1435 |
| 9,442,955 B1 * | 9/2016 | Pawar | ................ | G06F 17/30227 |
| 9,460,102 B1 * | 10/2016 | Bono | ........................ | G06F 3/06 |
| 2011/0093437 A1 | 4/2011 | Sampathkumar | | |
| 2012/0151155 A1 * | 6/2012 | Chakrabarti | ............ | G06F 9/526 711/152 |
| 2015/0032973 A1 * | 1/2015 | Liu | ..................... | G06F 12/0891 711/144 |

FOREIGN PATENT DOCUMENTS

| | | |
|---|---|---|
| CN | 102722536 A | 10/2012 |
| CN | 103678715 | 3/2014 |
| CN | 103886070 | 6/2014 |

* cited by examiner

*Primary Examiner* — Glenn Gossage
(74) *Attorney, Agent, or Firm* — BainwoodHuang (57) ABSTRACT

A method and device for checking false sharing in deletion of a data block are disclosed. The method includes setting weight bits and a weight reset bit in a mapping pointer (MP) pointing to the data block, wherein the weight reset bit is configured to define whether a weight indicated by the weight bits has been increased; and determining, based on the weight bits and the weight reset bit, whether false sharing occurs. The method determines whether false sharing occurs accurately and with low cost by using a computable formula. All information for such computable formula comes from in-memory MP, with no need to load any extra metadata, for example, with no need to access Block Meta Data. The method also considers a scenario where a weight increase occurs during a weight split and merge with other pointers.

11 Claims, 6 Drawing Sheets

METHOD AND DEVICE FOR CHECKING FALSE SHARING IN DATA BLOCK DELETION USING A MAPPING POINTER AND WEIGHT BITS

RELATED APPLICATION

This application claims priority from Chinese Patent Application Number CN201510622273.4, filed on Sep. 25, 2015 at the State Intellectual Property Office, China, titled "METHOD AND DEVICE FOR CHECKING FALSE SHARING IN DATA BLOCK DELETION," the contents of which is herein incorporated by reference in its entirety.

FIELD OF THE INVENTION

The embodiments disclosed herein relate to a storage system, and more particularly to a method and device for checking a false sharing in deletion of a data block.

BACKGROUND OF THE INVENTION

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE INVENTION

A method, system, and computer program product for checking false sharing in deletion of a data block, including setting weight bits and a weight reset bit in a mapping pointer (MP) pointing to the data block, wherein the weight reset bit is configured to define whether a weight indicated by the weight bits has been increased, and determining, based on the weight bits and the weight reset bit, whether a false sharing occurs.

BRIEF DESCRIPTION OF THE DRAWINGS

Drawings described herein are provided to further explain the present disclosure and constitute a part of the present application. The example embodiments of the disclosure and the explanation thereof are used to explain the present disclosure, rather than to limit the present disclosure.

DETAILED DESCRIPTION OF EMBODIMENTS

Reference is made to several example embodiments shown in the drawings to describe principles of the present disclosure. Though preferred embodiments of the present disclosure are illustrated in the drawings, it is understood that the embodiments are described only to facilitate those skilled in the art in better understanding of the present disclosure, rather than to limit the scope of the disclosure in any manner.

Typically, a storage system usually includes a primary file and a plurality of snap files. Each snap file indicates a point-of-time view of the primary file. Generally, the primary file and the snap files are stored in the same storage pool where some data blocks and metadata blocks are shared. Traditionally, when updates occur, the primary file and/or a snap file may also have its own data. Conventionally, the deletion of a snap file is essentially a process of de-allocating the snap file's underlying data blocks and metadata blocks. Generally, such snap files are widely used in data protection, data backup and virtualization environments, such as the fast provision and upgrading/updating of a virtual desktop infrastructure (VDI).

Figure 1:
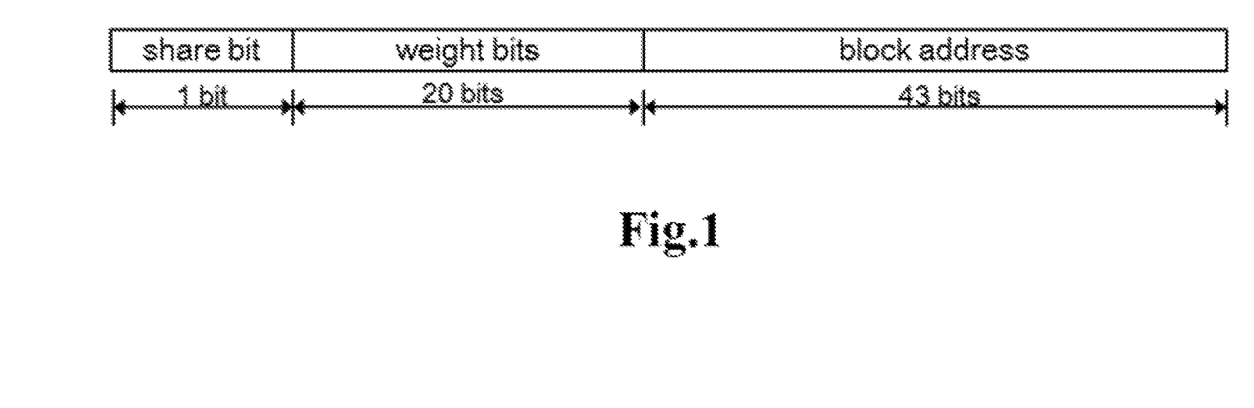
FIG. 1 illustrates a schematic configuration of a mapping pointer (MP) including a share bit, weight bits and block address.

Typically, each file looks up underlying data blocks through indirect or direct mapping pointers (MPs). Traditionally, an indirect block (IB) may have thousands of MPs depending on the IB size. Generally, when multiple files share the same block address, each MP takes independent weight during a write split. Conventionally, the total weight is stored in extra Block Metadata (BMD). For example, typically, in a BMD implementation, the size of BMD is 64 Bytes, and multiple BMD items are packed into one data block, as such, an 8 kilobyte (KB) block includes 128 BMD items. FIG. 1 illustrates a schematic configuration of a MP including a share bit (1 bit), weight bits (20 bits) and a block address (43 bits).

Figure 2A:
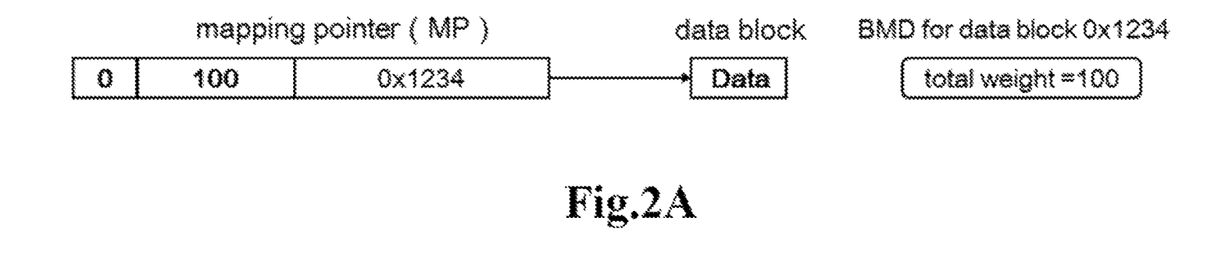
FIG. 2A illustrates a schematic configuration of an MP whose original weight is 100 and that weight of 100 is allocated to one data block.
Figure 2B:
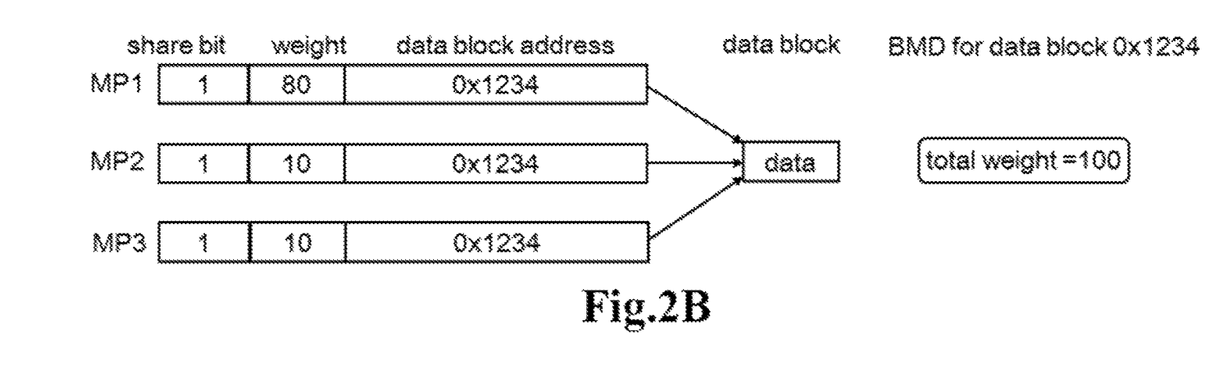
FIG. 2B illustrates a schematic configuration of an MP in a case that the MP in FIG. 2A is shared by new files.

Traditionally, when a block gets shared by one or more new files, such as due to the creation of new snaps, the weight will be split from an existing file (for example, source file). For example, FIG. 2A illustrates a schematic configuration of an MP whose original weight is 100 and this original weight of 100 has been totally assigned to one data block. FIG. 2B illustrates a scenario that the MP is shared with new files. In this scenario, a weight of 100 is split among mapping pointers MP1, MP2, MP3 according to a predefined split policy, for example, the weight of 100 is split into 80, 10 and 10, wherein the primary file and associated mapping pointer MP1 may take more weight, and each MP is provided with a share bit, as shown in FIG. 1B. However, typically, due to the fact that the weight splitting procedure might usually be done without any update (or access) to BMD, each file itself, after the split, may not be aware of other files sharing the same data block at the block level.

Conventionally, it may also happen that with the increased number of splits, the source file may not have enough weight for a further splitting. If so, it is necessary to add weight (also called "buy weight") to fulfill the splitting demand. In this case, the total weight in BMD will be increased accordingly.

False Sharing Problem

The false sharing is essentially a temporary inconsistency between the state in a file's MP and the state in the BMD.

Reference is made to FIGS. 2A and 2B again to illustrate the false sharing problem. As shown in FIG. 2B, if the block is initially shared by three files or mapping pointers (namely, MP1, MP2 and MP3), then once MP2 and MP3 are deleted, their weights are merged to MP1 completely. Actually, MP1 has become the only owner of the block (i.e. the block is not shared), but MP1 might not be aware that the state has changed from a shared state to an owned state, hence the share bit is still set and indicates a non-updated wrong state, which is called a false sharing. When MP1 needs to be deleted, the false sharing should firstly be identified and corrected to reclaim the corresponding data block, which is not being referred to by any MP. In practice, false sharing shall always be checked before an MP is to be deleted.

Typically, False sharing is checked in the following steps:
1. Check if the share bit is "set" (namely, as "1"). If the share bit is "1", then BMD will be looked up. Considering a complex storage system with many concurrent delete operations or snap refresh operations, BMD probably has to be read from disk. In practice, this will consume considerable inputs/outputs (IOs) and CPU resources, thereby becoming a bottleneck.
2. Once BMD is found, compare the weight between the MP and BMD.
    2.1 if the MP weight is less than the BMD total weight, namely, MP. weight<BMD.total weight, then merge the weight to another MP associated with the file;
    2.2 otherwise, namely, MP.weight=BMD.total weight, it can be determined that the block is owned (namely, not shared). Thus, the data block now can be deleted.

Generally, the approach above may cause performance issues due to the BMD looking up and reading. Conventionally, most blocks are shared in, for example, hundreds of fast provided virtual machine (VM) images through snap files and lots of running services in a system. Thus, traditionally, BMD is unlikely in memory, and instead, has to be read from the disk. In a real system, it may consume 90% of CPU resources and degrade normal IO response time.

In most embodiments, the current disclosure is directed to a method and device for checking false sharing in deletion of a data block. In various embodiments, the method determines whether a false sharing occurs in an accurate way and with low cost by using a computable formula. In some embodiments, information of the formula comes from the in-memory MP, without a need to load any extra metadata, for example, with no need to access BMD. In many embodiments, the method also considers a scenario where a weight increase occurs (even with a very small probability) during a weight split and merging process.

The first aspect of the present disclosure provides a method for checking false sharing in deletion of a data block. The method comprises setting weight bits and a weight reset bit in an MP pointing to a data block, wherein the weight reset bit is configured to define whether a weight indicated by the weight bits has been increased; and determining, based on the weight bits and the weight reset bit, whether a false sharing occurs.

According to an embodiment of the disclosure, determining, based on the weight bits and the weight reset bit, whether false sharing occurs comprises: determining, based on a share bit, whether the data block is shared; and in response to determining that the data block is shared, determining whether false sharing occurs by determining a value indicated by the weight reset bit and determining whether the weight indicated by the weight bits is equal to a predetermined maximum weight.

According to an embodiment of the disclosure, determining, based on the weight bits and the weight reset bit, whether false sharing occurs comprises: determining, based on a share bit, whether the data block is shared; and in response to determining that the data block is shared, determining that false sharing occurs if a value indicated by the weight reset bit is false and if the weight indicated by the weight bits is equal to the predetermined maximum weight.

According to an example embodiment of the disclosure, determining, based on the weight bits and the weight reset bit, whether false sharing occurs comprises: determining, based on the share bit, whether the data block is shared; and in response to determining that the data block is shared, determining that false sharing does not occur if a value indicated by the weight reset bit is true and/or if the weight indicated by the weight bits is not equal to the predetermined maximum weight.

According to an example embodiment of the disclosure, the method further comprises: in response to determining that the data block is not shared, deleting the MP and the data block to which the MP is pointing.

According to an example embodiment of the disclosure, the method further comprises: in response to determining that false sharing occurs, deleting the MP and the data block to which the MP is pointing; and in response to determining that false sharing does not occur, merging the weight indicated by weight bits of the MP into a weight indicated by weight bits of another MP associated with the data block to which the MP is pointing; updating the value indicated by the weight reset bit of the other MP; and deleting the MP.

According to an example embodiment of the disclosure, updating the value of weight reset bit of the other MP comprises: if the value of the weight reset bit of the MP is true, substituting the value of the weight reset bit of the other MP associated with the data block to which the MP is pointing with the value indicated by the weight reset bit of the MP; and if the value of the weight reset bit of the MP is false, keeping the value of the weight reset bit of the other MP associated with the data block to which the MP is pointing unchanged.

Figure 6:
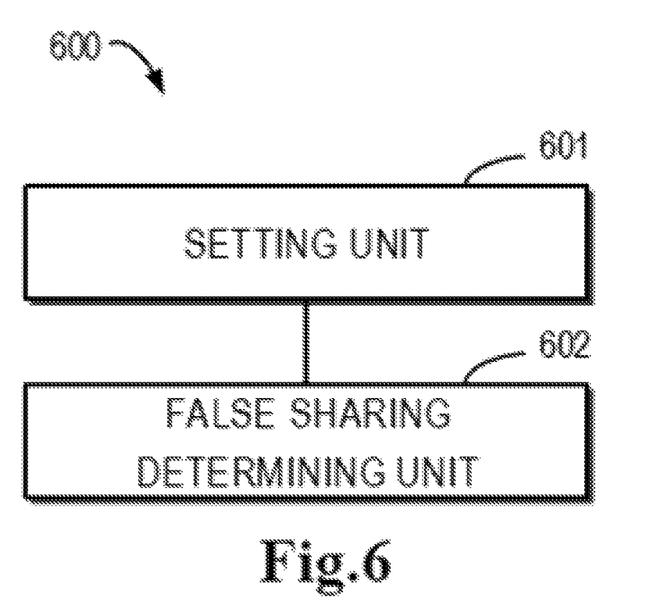
FIG. 6 illustrates a block diagram of the device for checking false sharing according to an embodiment of the present disclosure.

The second aspect of the present disclosure provides a device for checking false sharing in deletion of a data block, comprising: a setting unit 601 configured to set weight bits and a weight reset bit in an MP pointing to the data block, wherein the weight reset bit is configured to define whether a weight indicated by the weight bits has been increased; and a false sharing determining unit 602 configured to determine, based on the weight bits and the weight reset bit, whether a false sharing occurs.

According to an example embodiment of the disclosure, the false sharing determining unit comprises: a sharing determining unit configured to determine, based on a share bit, whether the data block is shared; and a first false sharing determining unit configured to, in response to determining that the data blocks is shared, determine whether false sharing occurs by determining a value indicated by the weight reset bit and determining whether the weight indicated by the weight bits is equal to a predetermined maximum weight.

In the device according to an example embodiment of the disclosure, the first false sharing determining unit is further configured to, in response to determining that the data block is shared, determine that false sharing occurs if a value of the weight reset bit is false and if the weight indicated by the weight bits is equal to the predetermined maximum weight.

In the device according to an example embodiment of the disclosure, the first false sharing determining unit is further configured to, in response to determining that the data block is shared, determine that false sharing does not occur if a value indicated by the weight reset bit is true and/or if the weight indicated by the weight bits is not equal to a predetermined maximum weight.

The device according to an example embodiment of the disclosure further comprises: a first deleting unit configured to, in response to determining that the data block is not shared, delete the MP and the data block to which the MP is pointing.

The device according to an example embodiment of the disclosure further comprises: a second deleting unit configured to, in response to determining that false sharing occurs, delete the MP and the data block to which the MP is pointing; and a weight merging unit configured to, in response to determining that false sharing does not occur, merge the weight indicated by the weight bits of the MP into a weight indicated by weight bits of another MP associated with the data block to which the MP is pointing; an updating unit configured to, in response to determining that false sharing does not occur, update the value of the weight reset bit of the other MP; and a third deleting unit configured to, in response to determining that false sharing does not occur, delete the MP.

According to an example embodiment of the disclosure, the updating unit is configured to: if the value of the weight reset bit of the MP is true, substitute the value of the weight reset bit of the other MP associated with the data block to which the MP is pointing with the value of the weight reset bit of the MP; and if the value of the weight reset bit of the MP is false, keep the value of the weight reset bit of the other MP unchanged.

The third aspect of the present disclosure provides a computer program product for checking false sharing in deletion of a data block. The computer program product is tangibly stored on a non-transitory computer-readable medium and comprises machine-executable instructions, the machine-executable instructions, when executed, causing a machine to perform steps of the method according to the first aspect of the present disclosure.

Figure 3:
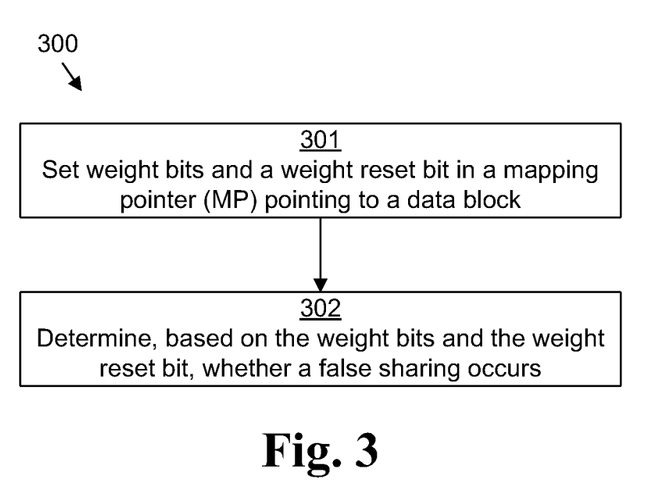
FIG. 3 illustrates a flow diagram of the method for checking false sharing according to an embodiment of the present disclosure.

FIG. 3 illustrates a flow diagram of the method for checking false sharing in deletion of a data block according to embodiments of the present disclosure. As shown in FIG. 3, the method 300 includes steps 301-302:

At 301: weight bits and a weight reset bit in the MP pointing to a data block are set, wherein the weight reset bit (also referred to as 'buy' bit) is used to define whether a weight indicated by the weight bits has been increased. At 302: it is determined, based on the weight bits and the weight reset bit, whether a false sharing occurs.

According to an example embodiment of the disclosure, the method, at 302, includes: determining whether the data block is shared based on the share bit; and in response to determining that the data block is shared, determining if false sharing occurs based on the value indicated by the weight reset bit and whether the weight indicated by the weight bits equals a predetermined maximum weight.

According to an example embodiment of the disclosure, the method, at step 302 further includes: determining, based on the share bit, whether the data block is shared; and in response to determining that the data block is shared, determining that false sharing occurs if the value indicated by weight reset bit (i.e. 'buy' bit) is false (i.e. logic value is 0) and if the weight (MP. weight) indicated by the weight bits is equal to the predetermined maximum weight (MAX_WEIGHT).

Specifically, if the following condition or logic is satisfied, it can be determined that false sharing occurs:

$$(\text{'buy' bit}=0) \ \&\& \ (\text{MP.weight}=\text{MAX\_WEIGHT}) \qquad (1),$$

wherein the 'buy' bit may be one bit out of the weight bits. Therefore, if one bit, for example, is set as the 'buy' bit in the weight bits of MP as shown in FIG. 1, the number of weight bits of MP will be decreased by 1 bit, and thus becomes 19 bits. Thus, the maximum weight indicated by the weight bits will become $2^{19}$ (i.e. MAX_WEIGHT=$2^{19}$). It is noted that, in general, the default value of the 'buy' bit is set as 0 when the current weight is sufficient. However, once the total weight increases (even with a small probability), the value of the 'buy' bit will be set to 1.

It is noted that the purpose for introducing the 'buy' bit is to ensure that the MAX_WEIGHT, as the basis for comparison in the above logic relation, is correct and effective. This is because, if a weight increase occurs, the total BMD weight will turn into a value higher than $2^{19}$, namely, greater than the predetermined MAX_WEIGHT. Thus, in the case of a weight increase, it might not be able to accurately determine whether false sharing occurs only by determining if MP.weight is equal to the predetermined MAX_WEIGHT.

According to an example embodiment of the disclosure, determining, based on the weight bits and the weight reset bit, whether a false sharing occurs includes: determining, based on the share bit, whether the data block is shared; and in response to determining that the data block is shared, determining that false sharing does not occur, if the value indicated by the weight reset bit is true ('buy' bit=1), and/or if the weight indicated by the weight bits is not equal to the predetermined maximum weight (MP.weight≠MAX_WEIGHT). For example, as long as MP.weight MAX_WEIGHT, it can be determined that the data block must be shared by other files (i.e. false sharing does not occur).

Figure 4:
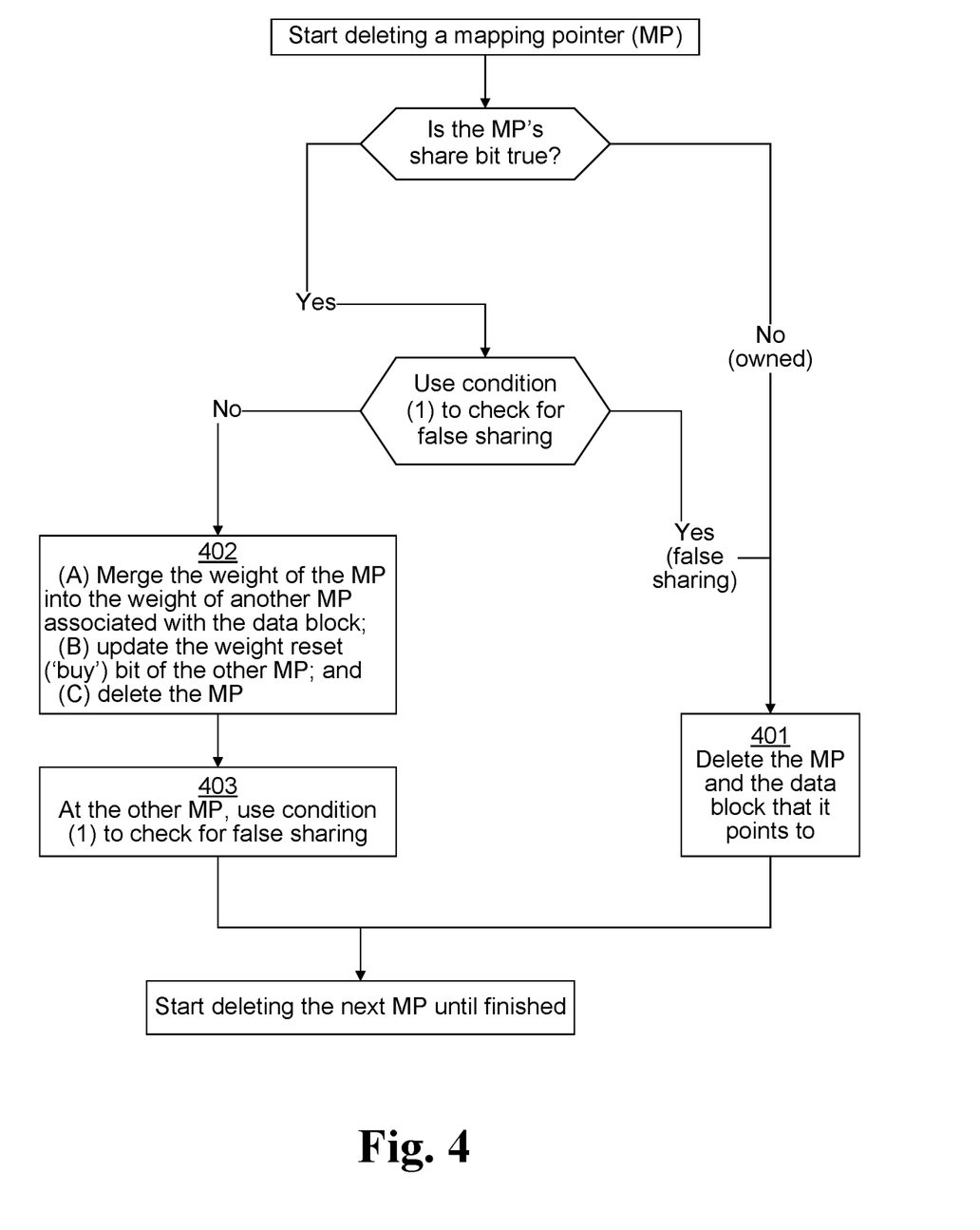
FIG. 4 illustrates a flow diagram of the method for checking false sharing according to another embodiment of the present disclosure.

FIG. 4 illustrates a flow diagram of a method for checking false sharing in deletion of a data block according to another embodiment of the present disclosure. According to an example embodiment of the disclosure, the method as shown in FIG. 4 includes: at 401, in response to determining that the data block is not shared, deleting the MP and the data block to which the MP is pointing.

According to an example embodiment of the disclosure, the method as shown in FIG. 4 further includes: at 401, in response to determining that false sharing occurs, deleting the MP and the data block to which the MP is pointing; and in response to determining that false sharing does not occur, at 402, merging the weight indicated by the weight bits of the MP into the weight indicated by the weight bits of another MP associated with the data block to which the MP is pointing; updating the value of the weight reset bit of the other MP; and deleting the MP.

Alternatively or additionally, the method as shown in FIG. 4 further includes: at 403, determining whether false sharing occurs at the other MP by using the above condition or logic (1).

According to an example embodiment of the disclosure, updating the value of the weight reset bit of another MP at 402 includes: if the value of the weight reset bit of the MP is true (i.e. 'buy' bit=1), substituting the value of the weight reset bit of the other MP associated with the data block to which the MP is pointing with the value (i.e. 1) of the weight reset bit of the MP, which may also be called "infective" attribute of the 'buy' bit; and if the value of the weight reset bit of the MP is false (i.e. 'buy' bit=0), not substituting the value of the weight reset bit of the other MP with the value (i.e. 0) of the weight reset bit of the MP, and in other words, keeping the value of the weight reset bit of the other MP unchanged.

Figure 5A:
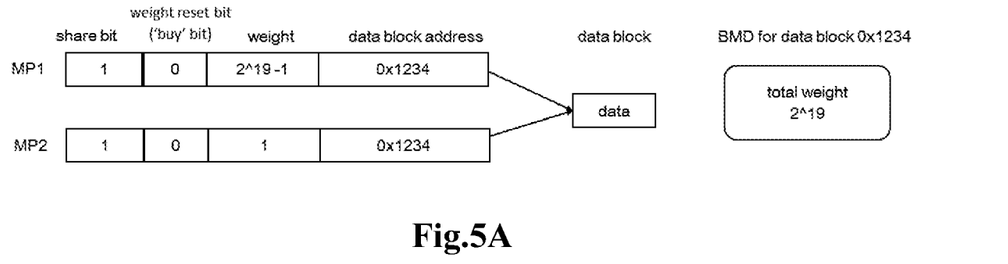
FIGS. 5A and 5B together illustrate an example of weight increase according to an embodiment of the present disclosure.
Figure 5B:
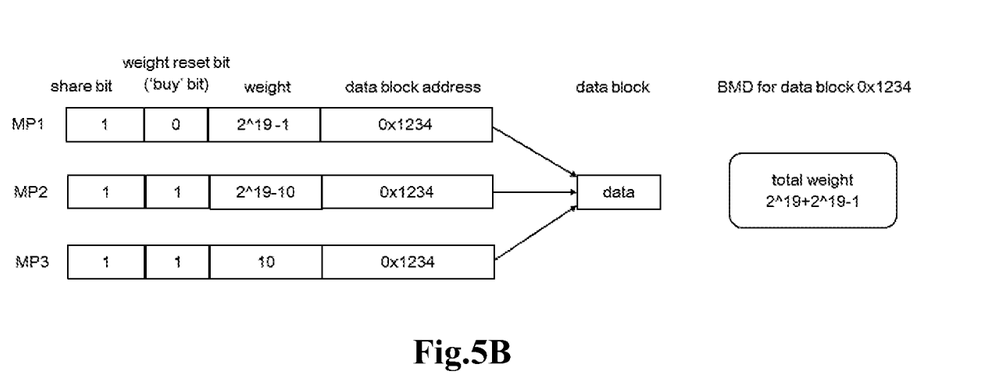

Reference is made to the example of FIGS. 5A and 5B to further illustrate the method as shown in FIG. 4. FIGS. 5A and 5B together illustrate an example of weight increase according to an embodiment of the present disclosure.

During the process of writing, if a weight increase occurs, the 'buy' bit is set as 1 both in the original MP and the new MP. For example, as shown in FIG. 5A, though the maximum weight is $2^{19}$, the majority of weight is owned by MP1 and the weight of MP2 is only 1 (i.e. not enough to be split with other new MPs). Then, if a new MP3 is to share the same data block with MP2, the weight of MP2 needs to be increased. Assuming that the maximum allowed weight of MP2 is also $2^{19}$, then a weight of $2^{19}-1$ should be added. Meanwhile, the total BMD weight will also increase by $(2^{19}-1)$. Now, MP2 obtains enough weight to be split with MP3. As shown in FIG. 5B, MP3 obtains a weight of 10 thereafter and the 'buy' bits of MP2 and MP3 both are set to 1.

For example, if MP1 is to be deleted, according to the steps as shown in FIG. 4, the 'buy' bit should be firstly checked. Upon determining that the 'buy' bit is set to be 1, the above logic (1) is used to determine whether false sharing occurs. According to the embodiment as shown in FIG. 5B, MP.weight=$2^{19}-1 \neq$ MAX_WEIGHT, and thus it can be determined that false sharing does not occur. Then the method proceeds to 402 (FIG. 4), in which the MP1 weight together with the 'buy' bit is merged into another MP (e.g. MP2) associated with the data block to which MP1 is pointing. MP2 now has a weight of $2^{19}-1+2^{19}-10$. Moreover, as the 'buy' bit=0 at MP1, the value (i.e. 0) of the 'buy' bit of MP1 will not be used to substitute the 'buy' bit value of MP2 associated with MP1. Thereafter, alternatively or additionally, the above logic relation (1) is used again at 403 to check if false sharing occurs in MP2. Now, since MP1 has transferred all its weight to MP2, MP1 can be deleted.

Another embodiment of the present disclosure is directed to a device 600, shown in FIG. 6, for checking false sharing in deletion of a data block. Device 600 includes a setting unit 601 configured to set the weight bits and weight reset bit in the MP pointing to the data block, wherein the weight reset bit is configured to define whether a weight indicated by the weight bits has been increased. Device 600 also includes a false sharing determining unit 602 configured to determine, based on the weight bits and the weight reset bit, whether false sharing occurs.

According to an example embodiment of the disclosure, the setting unit 601 may further include: a weight bit setting unit configured to set the weight bits in the MP pointing to the data block; and a weight reset bit setting unit configured to set the weight reset bit in the MP pointing to the data block, wherein the weight reset bit is configured to define whether the weight indicated by the weight bits has been increased.

According to an example embodiment of the disclosure, the false sharing determining unit 602 comprises: a sharing determining unit configured to determine, based on a share bit, whether the data block is shared; and a first false sharing determining unit configured to, in response to determining that the data block is shared, determine whether false sharing occurs by determining a value indicated by the weight reset bit and determining whether the weight indicated by the weight bits is equal to a predetermined maximum weight.

According to an example embodiment of the disclosure, the first false sharing determining unit is further configured to, in response to determining that the data block is shared, determine that false sharing occurs if a value of the weight reset bit is false and if the weight indicated by the weight bits is equal to the predetermined maximum weight.

According to an example embodiment of the disclosure, the first false sharing determining unit is configured to, in response to determining that the data block is shared, determine that false sharing does not occur if the value indicated by the weight reset bit is true and/or if the weight indicated by the weight bits is not equal to the predetermined maximum weight.

The device 600 according to an example embodiment of the disclosure further includes: a first deleting unit configured to, in response to determining that the data block is not shared, delete the MP and the data block to which the MP is pointing.

The device 600 according to an example embodiment of the disclosure further includes: a second deleting unit configured to, in response to determining that false sharing occurs, delete the MP and the data block to which the MP is pointing; and a weight merging unit configured to, in response to determining that false sharing does not occur, merge the weight indicated by the weight bits of the MP into the weight indicated by the weight bits of another MP associated with the data block to which the MP is pointing; an updating unit configured to, in response to determining that false sharing does not occur, update the value of the weight reset bit of the other MP; and a third deleting unit configured to, in response to determining that false sharing does not occur, delete the MP.

According to an example embodiment of the disclosure, the updating unit is configured to: if the value of the weight reset bit of the MP is true, substitute the value of the weight reset bit of the other MP associated with the data block to which the MP is pointing with the value of the weight reset bit of the MP; and if the value of the weight reset bit of the MP is false, keep the value of the weight reset bit of the other MP unchanged.

To sum up, various embodiments of the present invention provide a method and device for checking false sharing in deletion of a data block. The method includes: setting weight bits and a weight reset bit in a mapping pointer (MP) pointing to the data block, wherein the weight reset bit is configured to define whether a weight indicated by the weight bits has been increased; and determining, based on the weight bits and the weight reset bit, whether a false sharing occurs. The method determines whether a false sharing occurs accurately and with low cost by using a computable formula. All information for such computable formula comes from in-memory MP, with no need to load any extra metadata, for example, with no need to access Block MetaData (BMD). The method also considers a scenario where a weight increase occurs during the weight split and mergence.

The above are only optional embodiments and not limited to the present disclosure. For those skilled in the art, the present disclosure allows various modifications and changes. Any modifications, equivalent alternatives and improvements, etc. within the spirit and principle of the present disclosure shall be included in the scope of protection of the present disclosure.

What is claimed is:

1. A method for checking false sharing in deletion of a data block on a data storage system, comprising:
   setting weight bits and a weight reset bit in a mapping pointer (MP) pointing to the data block, wherein the weight reset bit defines whether a weight indicated by the weight bits has been increased;
   determining, based on the weight bits and the weight reset bit, whether false sharing occurs, wherein determining whether false sharing occurs comprises determining, based on a share bit, whether the data block is shared; and
   in response to determining that the data block is not shared, deleting the MP and the data block to which the MP is pointing.

2. The method according to claim 1, wherein determining whether false sharing occurs further comprises:
   in response to determining that the data block is shared, determining whether false sharing occurs by determining a value indicated by the weight reset bit and determining whether the weight indicated by the weight bits is equal to a predetermined maximum weight.

3. The method according to claim 1, wherein determining whether false sharing occurs further comprises:
   in response to determining that the data block is shared, determining that false sharing occurs if a value indicated by the weight reset bit is false and if the weight indicated by the weight bits is equal to a predetermined maximum weight.

4. The method according to claim 1, wherein determining whether false sharing occurs further comprises:
   in response to determining that the data block is shared, determining that false sharing does not occur if a value indicated by the weight reset bit is true and/or if the weight indicated by the weight bits is not equal to a predetermined maximum weight.

5. A method for checking false sharing in deletion of a data block on a data storage system, comprising:
   setting weight bits and a weight reset bit in a mapping pointer (MP) pointing to the data block, wherein the weight reset bit defines whether a weight indicated by the weight bits has been increased;
   determining, based on the weight bits and the weight reset bit, whether false sharing occurs, wherein determining whether false sharing occurs comprises:
      determining, based on a share bit, whether the data block is shared;
      in response to determining that the data block is shared, determining that false sharing occurs if a value indicated by the weight reset bit is false and if the weight indicated by the weight bits is equal to a predetermined maximum weight; and
      in response to determining that the data block is shared, determining that false sharing does not occur if a value indicated by the weight reset bit is true and/or if the weight indicated by the weight bits is not equal to a predetermined maximum weight;
   in response to determining that false sharing occurs, deleting the MP and the data block to which the MP is pointing; and
   in response to determining that false sharing does not occur, merging the weight indicated by the weight bits of the MP into a weight indicated by weight bits of another MP associated with the data block to which the MP is pointing, updating a value of the weight reset bit of the other MP, and deleting the MP.

6. The method according to claim 5, wherein updating the value of the weight reset bit of the other MP comprises:
   if the value of the weight reset bit of the MP is true, substituting the value of the weight reset bit of the other MP associated with the data block to which the MP is pointing with the value of the weight reset bit of the MP; and
   if the value of the weight reset bit of the MP is false, keeping the value of the weight reset bit of the other MP associated with the data block to which the MP is pointing unchanged.

7. A computer program product for checking for false sharing in deletion of a data block on a data storage system, the computer program product comprising:
   a non-transitory computer readable medium encoded with computer-executable code, wherein the code is configured to cause a computer to execute steps of:
      setting weight bits and a weight reset bit in a mapping pointer (MP) pointing to the data block, wherein the weight reset bit defines whether a weight indicated by the weight bits has been increased;
      determining, based on the weight bits and the weight reset bit, whether false sharing occurs, wherein determining whether false sharing occurs comprises determining, based on a share bit, whether the data block is shared; and
      in response to determining that the data block is not shared, deleting the MP and the data block to which the MP is pointing.

8. The computer program product according to claim 7, wherein determining whether false sharing occurs further comprises:
   in response to determining that the data block is shared, determining whether false sharing occurs by determining a value indicated by the weight reset bit and determining whether the weight indicated by the weight bits is equal to a predetermined maximum weight.

9. The computer program product according to claim 7, wherein determining whether false sharing occurs further comprises:
   in response to determining that the data block is shared, determining that false sharing occurs if a value indicated by the weight reset bit is false and if the weight indicated by the weight bits is equal to a predetermined maximum weight.

10. The computer program product according to claim 7, wherein determining whether false sharing occurs further comprises:
    in response to determining that the data block is shared, determining that false sharing does not occur if a value indicated by the weight reset bit is true and/or if the weight indicated by the weight bits is not equal to a predetermined maximum weight.

11. The computer program product according to claim 7, wherein the code is further configured to cause the computer to execute steps of:

in response to determining that false sharing occurs, deleting the MP and the data block to which the MP is pointing; and in response to determining that false sharing does not occur, merging the weight indicated by the weight bits of the MP into a weight indicated by weight bits of another MP associated with the data block to which the MP is pointing, updating a value of the weight reset bit of the other MP, and deleting the MP.

\* \* \* \* \*